US012242746B2

(12) United States Patent
Yoo et al.

(10) Patent No.: US 12,242,746 B2
(45) Date of Patent: Mar. 4, 2025

(54) STORAGE DEVICE AND METHOD FOR STORING META DATA IN A DISTRIBUTED MANNER

(71) Applicant: SAMSUNG ELECTRONICS CO., LTD., Gyeonggi-do (KR)

(72) Inventors: Sangjin Yoo, Suwon-si (KR); Kwangwoo Lee, Suwon-si (KR); Heewon Lee, Suwon-si (KR); Byungchan Park, Suwon-si (KR); Hyojin Ahn, Suwon-si (KR); Dongcheul Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/196,788

(22) Filed: May 12, 2023

(65) Prior Publication Data

US 2024/0152289 A1 May 9, 2024

(30) Foreign Application Priority Data

Nov. 4, 2022 (KR) .......................... 10-2022-0146182

(51) Int. Cl.
*G06F 3/06* (2006.01)
(52) U.S. Cl.
CPC ............ *G06F 3/064* (2013.01); *G06F 3/0623* (2013.01); *G06F 3/0656* (2013.01); *G06F 3/0673* (2013.01)
(58) Field of Classification Search
CPC .... G06F 3/0673; G06F 3/0656; G06F 3/0623; G06F 3/064
See application file for complete search history.

(56) References Cited

U.S. PATENT DOCUMENTS

| | | | |
|---|---|---|---|
| 7,953,950 | B2 | 5/2011 | Fujimoto |
| 8,429,492 | B2 | 4/2013 | Yoon et al. |
| 10,353,584 | B2 | 7/2019 | Wang et al. |
| 10,481,818 | B2 | 11/2019 | Frolikov |
| 10,635,345 | B2 | 4/2020 | Frolikov |
| 10,922,167 | B2 | 2/2021 | Her et al. |
| 11,385,908 | B1 * | 7/2022 | Kulchytskyy ............. G06F 8/65 |
| 2012/0030665 | A1 | 2/2012 | Mccarthy et al. |
| 2014/0380294 | A1 | 12/2014 | Wu |

(Continued)

OTHER PUBLICATIONS

Anonymous, Software versioning, Wikipedia, Oct. 18, 2022, XP093134107. (16 pages total).

(Continued)

*Primary Examiner* — Edward J Dudek, Jr.
(74) *Attorney, Agent, or Firm* — Sughrue Mion, PLLC

(57) ABSTRACT

There is provided a storage device, which includes: a memory device that includes a plurality of memory blocks, and stores first meta data including first status data and a first parameter in a first memory block among the plurality of memory blocks; and a memory controller that stores second meta data including second status data and second parameters, determines final meta data among a plurality of pieces of meta data including the first meta data and the second status data by comparing a plurality of pieces of status data with the first status data and the second status data, performs parameter confirmation for storing the final meta data in the meta block, and controls the memory device based on a parameter stored in the meta block.

20 Claims, 9 Drawing Sheets

(56) References Cited

U.S. PATENT DOCUMENTS

2021/0064390 A1    3/2021  Park et al.
2021/0271604 A1*   9/2021  Cariello .............. G06F 12/0882
2022/0083240 A1*   3/2022  Park ........................ G06F 21/62

OTHER PUBLICATIONS

Anonymous, "Installation (computer programs)", Wikipedia, Oct. 4, 2022, XP093134309. (7 pages total).
Communication issued Apr. 12, 2024 by the European Patent Office in European Patent Application No. 23204478.4.

* cited by examiner

STORAGE DEVICE AND METHOD FOR STORING META DATA IN A DISTRIBUTED MANNER

CROSS-REFERENCE TO RELATED APPLICATION

This application claims priority to Korean Patent Application No. 10-2022-0146182 filed in the Korean Intellectual Property Office on Nov. 4, 2022, the entire contents of which are incorporated herein by reference.

BACKGROUND

1. Field

The disclosure relates to a storage system and an operation method of the storage system.

2. Description of the Related Art

A memory device contains software to perform various functions. Such software is called embedded software or firmware. With the rapid development of memory devices, the role of firmware is also increasing in various ways. Firmware is usually continuously updated to reflect user's additional requirements or to solve problems in hardware or software, and firmware updates of product are made in various ways.

Generally, firmware has a close relationship with the hardware characteristics of a memory device. That is, when the characteristics of the memory device change, the firmware change is also essential. Firmware development requirements increases the dependencies between various hardware elements and firmware development, thus causing many problems in terms of product development schedule and efficiency.

SUMMARY

Example embodiments provide an apparatus, a method and a system for easing the dependency between firmware and hardware.

Further, example embodiments provide an apparatus, a method and a system for easing increasing the reliability of the storage system.

According to an aspect of the disclosure, there is provided a storage device including: a memory device including a plurality of memory blocks including a meta block, the memory device storing first meta data including first status data and a first parameter in a first memory block among the plurality of memory blocks; and a memory controller configured to: store second meta data including second status data and second parameter, determine final meta data among a plurality of pieces of meta data including the first meta data and the second meta data by comparing a plurality of pieces of status data with the first status data and the second status data based on a status of the meta block, perform parameter confirmation for storing the final meta data in the meta block, and control the memory device based on a parameter stored in the meta block.

The meta block is the first memory block, and the memory controller is further configured to store the first meta data as the final meta data.

The memory controller includes a buffer memory that stores the first meta data read from the first memory block, and the memory controller is further configured to determine the final meta data by comparing the first meta data stored in the buffer memory with the second meta data.

The memory controller includes a buffer memory that stores third meta data including third status data and a third parameter, the plurality of pieces of status data further include the third status data, and the plurality of pieces of meta data further include the third meta data.

The first parameter, the second parameter, and the third parameter are data configured to perform a defense code.

The memory controller is further configured to, based on the status of the meta block being an update status in which meta data stored in the meta block is changeable or an empty status in which no meta data is stored in the meta block, perform the parameter confirmation.

The memory controller is further configured to, based on the status of the meta block being a decision status in which meta data is stored in the meta block, control the memory device based on parameters stored in the meta block without the parameter confirmation.

The memory controller is further configured to perform the parameter confirmation based on receiving an update command indicating a status change of the meta block.

The memory controller is further configured to read the meta block based on a read level, among a plurality of read levels in a set.

The memory controller is further configured to program the first meta data to the memory device through an encryption, and program the second meta data to the memory controller through the encryption.

According to another aspect of the disclosure, there is provided a storage system including: a storage device that stores first meta data includes first status data and a first parameter in at least one of a memory device including a plurality of memory blocks containing a meta block and a memory controller that controls the memory device; and a host device including a host memory, which stores second meta data including second status data and a second parameter y, the host device configured to control the storage device, the storage device is further configured to: determine final meta data among a plurality of pieces of meta data including the first meta data and the second status data by comparing a plurality of pieces of status data including the first status data and the second status data based on a status of the meta block, and perform parameter confirmation for storing the final meta data in the meta block.

The meta block stores third meta data including third status data and a third parameter, the memory controller further includes a buffer memory storing the third meta data read from the meta block, the plurality of pieces of status data further include the third status data, and the plurality of pieces of meta data further include the third meta data.

The storage device is configured to, based on the status of the meta block being an update status in which meta data stored in the meta block is changeable or an empty state in which no meta data is stored in the meta block, perform the parameter confirmation.

The memory controller is further configured to, based on the status of the meta block being a decision status in which meta data is stored in the meta block, control the storage device based on parameters stored in the meta block without the parameter confirmation.

The memory controller is further configured to perform the parameter confirmation based on receiving an update command indicating a status change of the meta block.

The memory controller is further configured to read the meta block through a read level among a plurality of read levels in a set.

According to an aspect of the disclosure, there is provided a driving method of a storage system, including: comparing status data of each of a plurality of pieces of meta data stored in at least one of a memory device including a plurality of memory blocks, a memory controller controlling the memory device, and host device interfacing with the memory controller, determining a final meta data based on a result of the comparing the status data of each of the plurality of pieces of meta data, programming the final meta data in a meta block of the memory device; and controlling the memory device based on the final meta data.

The driving method further including: before the determining the final meta data: reading the meta block according to a read level, among a plurality of read levels; based on the number of fail bits in data for reading the meta block being greater than or equal to a predetermined number, reading the meta block according to an unused read level among the plurality of read levels; determining a status of the meta block by using data read from the meta block; and based on the meta block is in a decision status in which meta data is stored in the meta block, changing the meta block to an update status before programming the final meta data into the meta block.

The determining the final meta data includes: reading first meta data from a first memory block among the plurality of memory blocks and storing the read first meta data in a buffer memory in the memory controller; and determining the final meta data by comparing the first meta data stored in the buffer memory with second meta data stored in one of the memory device, the memory controller, and the host device.

The driving method further including, before the determining the final meta data, programming the plurality of pieces of meta data through encryption.

BRIEF DESCRIPTION OF THE DRAWINGS

The above and/or other aspects will be more clearly understood from the following detailed description taken in conjunction with the accompanying drawings, in which.

DETAILED DESCRIPTION

Figure 1:
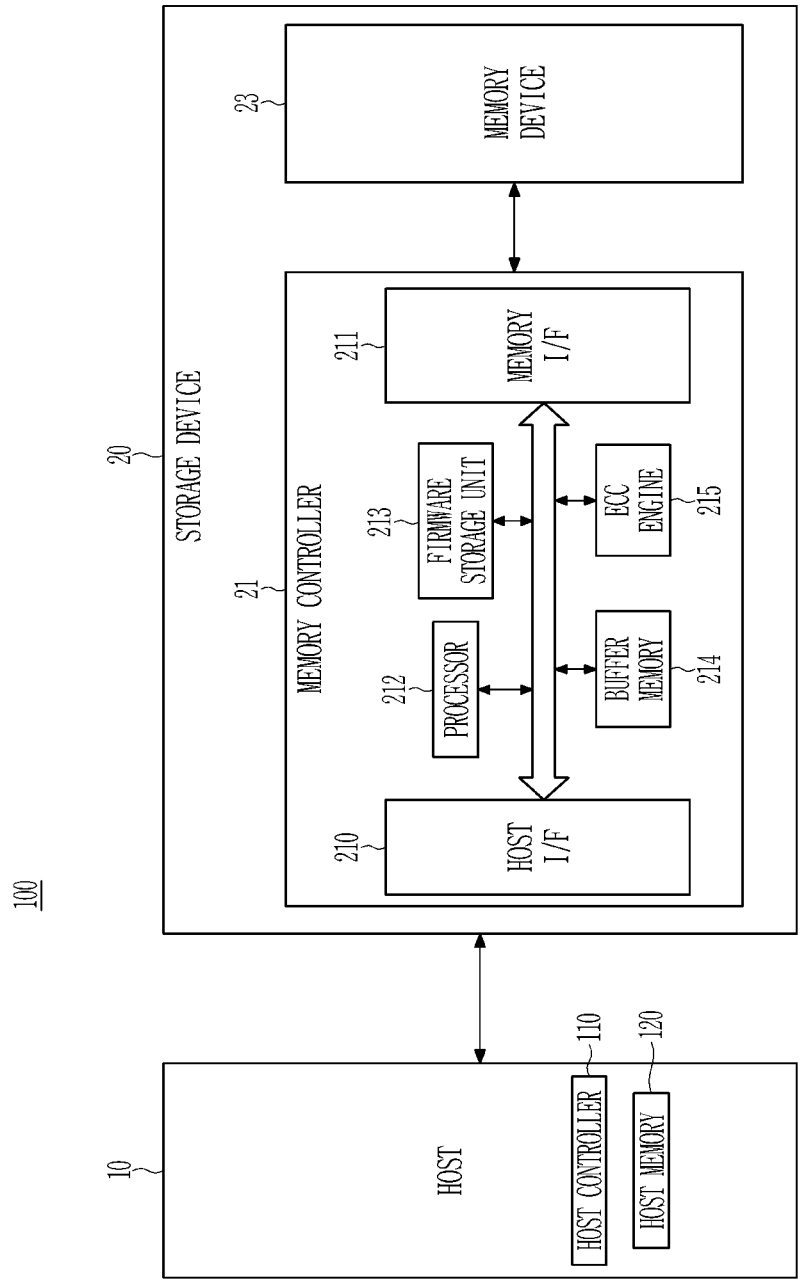
FIG. 1 is a block diagram of a storage system according to an example embodiment.

In the following detailed description, only certain embodiments of the disclosure have been shown and described, simply by way of illustration. As those skilled in the art would realize, the described embodiments may be modified in various different ways, all without departing from the spirit or scope of the disclosure.

Accordingly, the drawings and description are to be regarded as illustrative in nature and not restrictive. Like reference numerals designate like elements throughout the specification. In the flowchart described with reference to the drawing, the order of operations may be changed, several operations may be merged, a certain operation may be divided, and a specific operation may not be performed.

In addition, expressions written in the singular can be interpreted as singular or plural, unless explicit expressions such as "one" or "single" are used. Terms containing ordinal numbers, such as first, second, and the like may be used to describe various configurations elements, but constituent elements are not limited by these terms. These terms may be used for the purpose of distinguishing one constituent element from another constituent element.

Figure 2:
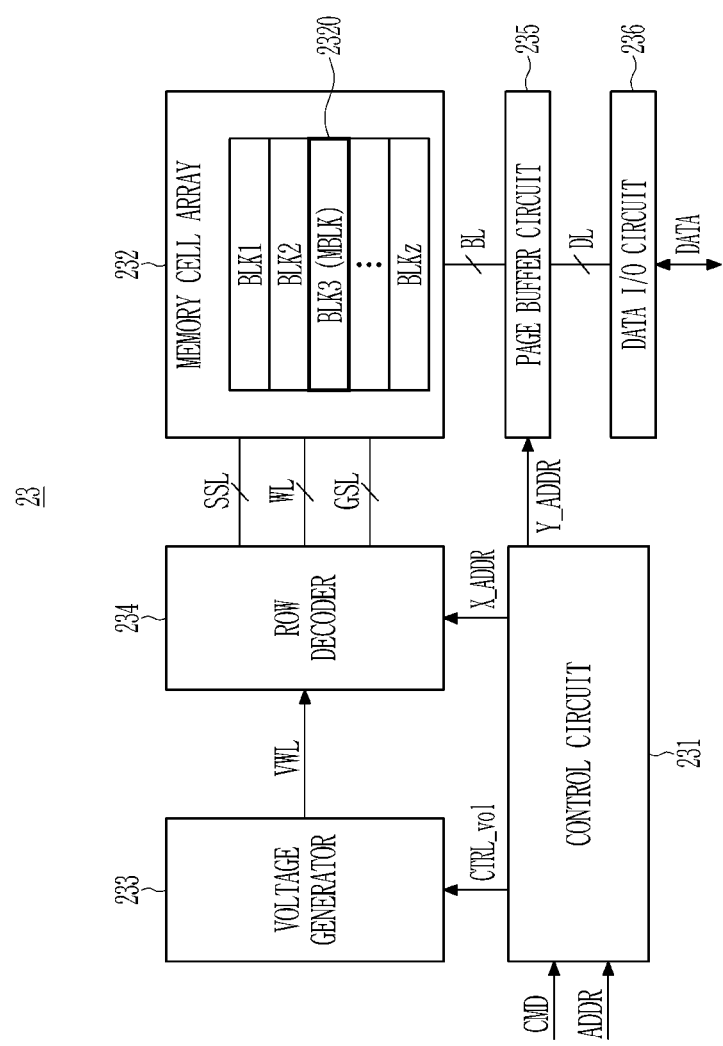
FIG. 2 is a block diagram of a memory device of FIG. 1.

FIG. 1 is a block diagram of a storage system according to an example embodiment, and FIG. 2 is a block diagram of a memory device of FIG. 1.

Referring to FIG. 1, a storage system 100 may include a host device 10 and a storage device 20.

The host device 10 may include a computing platform (or computing device) that can interface with the storage device 20. The host device 10 may include, for example, a desktop computer, a server computer, a tablet computer, a laptop computer, a mobile phone such as a smartphone, a multimedia player, game consoles, televisions, various types of Internet of Things (IoT) devices, and the like. However, the disclosure is not limited thereto, and as such, according to another example embodiment, the host device 10 may include other electronic devices.

The host device 10 may include a host controller 110 and a host memory 120.

The host controller 110 may execute instructions to perform various operations (e.g., calculation, logic, control, input and output, etc.). According to an example embodiment, instructions may be software codes or instructions words. The host controller 110 may be, for example, a central processing unit (CPU), a graphics processing unit (GPU), a microprocessor, or an application processor (AP). The host controller 110 may manage an operation of storing data in a buffer region of the memory device 23. For example, the data may be program data or read data. According to an example embodiment, the host controller 110 may also manage an operation of reading data from the buffer region of the memory device 23.

The host memory 120 may be a system memory accessed and used by the host controller 110. The host memory 120 may include, for example, a random access memory such as a dynamic random access memory (DRAM).

In an example embodiment, the host controller 110 and the host memory 120 may be implemented as separate semiconductor chips. In another example embodiment, the host controller 110 and the host memory 120 may be integrated into the same semiconductor chip. For example, the host controller 110 may be any one of a plurality of modules included in an application processor. The application processor may be implemented as a system on chip (SoC). In addition, the host memory 120 may be an embedded memory included in the application processor, or may be a non-volatile memory or memory module disposed outside the application processor.

The host device 10 may perform various operations by providing (or outputting) instructions to the storage device 20. For example, the host device 10 may provide (or output) a read instruction to the storage device 20 to read data from the storage device 20 or may provide (or output) a program instruction to the storage device 20 to store data in the storage device 20. In an example embodiment, the storage device 20 may be detachably connected to the host device 10. In an example embodiment, the storage device 20 may be integrated within the host device 10 or non-removably connected to the host device 10.

The storage device 20 may include storage media for storing data according to a request from the host device 10. According to an example embodiment, the storage device 20 is a non-volatile memory-based storage device and may include a memory controller 21 and a memory device 23.

The memory controller 21 may control access to the memory device 23. For example, the memory controller 21 may transmit data from the memory device 23 to the host memory 120 by executing a read instruction or transmit data from the host memory 120 to the memory device 23 by executing a program instruction.

According to an example embodiment, the memory controller 21 may support a non-volatile memory express (NVMe) protocol as a protocol for accessing the memory device 23.

According to an example embodiment, the memory controller 21 may read and execute firmware and perform a function of controlling the storage device 20. Firmware may include a flash translation layer (FTL) that can perform firmware or address translation operations that perform operations described in this specification.

The memory controller 21 may include a host interface (I/F) 210, a memory interface (I/F) 211, a processor 212, a firmware storage unit 213, a buffer memory 214, and an error correction code (ECC) engine 215.

The host interface 210 may transmit a packet to the host device 10 or receive a packet from the host device 10. According to an example embodiment, a packet transmitted from the host device 10 to the host interface 210 may include a command or data to be programmed into the memory device 23. The packet transmitted from the host interface 210 to the host device 10 may include a response to a command or data read from the memory device 23.

The memory interface 211 may transmit data to be programmed into the memory device 23 to the memory device 23 or receive data read from the memory device 23. The memory interface 211 may be implemented to comply with standard protocols such as Toggle or ONFI.

The processor 212 may execute any suitable firmware. The firmware storage unit 213 or a buffer memory 214 may be used as an operation memory of the processor 212. Furthermore, the memory device 23 or the host memory 120 may also be used as the operation memory of the processor 212.

The processor 212 may execute firmware to control the overall operation of the memory device 23. For example, the processor 212 may execute firmware to perform a data read operation to read data from the memory device 23 and a data program operation to program the memory device 23. For example, the processor 212 may execute firmware to change the state of a particular memory block in the memory device 23.

In an example embodiment, the processor 212 may execute firmware to execute a defense code on the memory device 23. The defense code may collectively refer to various techniques for slowing degradation caused by miniaturization of the process of the memory device 23 and various external environments. The defense code may be divided into a prevention technology for preemptively preventing degradation of a NAND flash memory and a recovery technology for reducing the number of errors. The prevention technology includes garbage collection for block management, wear leveling to pursue uniform degradation, and read reclaim to block defects in advance by predicting and transcribing the degree of degradation in advance and a program-erase (PE) cycle may include a technology that extends lifespan by using variable parameters. The recovery technology may include a technique of reducing the number of errors by moving the read level to an optimal position when the number of errors increases due to a wrong read level.

The firmware storage unit 213 may store a software binary for controlling the operation of the storage device 20. For example, the software binary may include system software such as a kernel, an operating system, a device driver, and a bootloader that is executed when power is applied to the storage device 20. For example, the bootloader may be a program that performs tasks necessary for the kernel to start properly and starts the operating system. In an example embodiment, the firmware storage unit 213 may be configured with a non-volatile memory.

In an example embodiment, the firmware storage unit 213 may store a plurality of pieces of meta data for driving firmware.

The meta data may include parameters indicating information related to the storage device 20 and status data indicating the memory device 23 corresponding to the parameters. For example, cell characteristics of the memory device 23 may differ depending on differences in manufacturing process lines and surrounding environments. For example, parameters used for reading data in the memory device 23 or programming data in the memory device 23 may be different according to cell characteristics of different memory devices 23. For example, two memory devices 23 of the same type but manufactured in different process lines may use different parameters. For example, the status data in the meta data may indicate which memory device 23, among the two memory devices 23, the parameter in the meta data corresponds to. The disclosure is not limited to two memory devices 23, and as such, according to another example embodiment, more than two memory devices may be provided.

In an example embodiment, the parameters include read level data used when reading the memory device 23, register data generated and updated while the firmware is running, program and program-erase cycle data, and mapping data used to convert the logical address of the host device 10 to a physical address of the memory device 23. In addition, the parameter includes data on various timings for driving the storage device 20, such as data on the standard time for response time until data is read from the memory device 23 in response to receiving a read command from the host device 10.

In an example embodiment, the parameter may include data regarding the number of memory cells allocated to a turbo write buffer within the memory device 23. The turbo write buffer may be formed of a non-volatile single-level cell (SLC) cache, an SLC buffer, and the like. The storage device 20 may perform a turbo write operation based on a SLC buffering method or various methods supporting fast write speed.

For example, when a turbo write function is activated by the storage device 20, the storage device 20 may perform the turbo write operation by first writing write data received from the host device 10 into the turbo write buffer. In this case, since the storage device 20 writes the write data received from the host device 10 into the turbo write buffer (e.g., SLC program), it can be written faster than when a normal write operation (e.g., TLC program) is performed.

In an example embodiment, the parameter may include data necessary to perform an action based on the defense code within the storage device 20. For example, the parameter may include address mapping data, bad block data, and the like managed by a garbage collection or wear leveling operation.

In an example embodiment, the status data may be data pointing to the memory device 23 corresponding to the parameter. For example, the memory controller 21 may determine a parameter corresponding to the memory device 23 among parameters of a plurality of pieces of meta data by using the status data of the plurality of pieces of meta data. The memory controller 21 may determine whether the memory device 23 corresponds to a first memory device or a second memory device as status data, and determine the parameter of the first memory device or the parameter of the second memory device as the parameter corresponding to the memory device 23. That is, the memory controller 21 may determine final meta data corresponding to the memory device 23 from among the plurality of pieces of meta data using the status data.

For example, the status data may indicate the order in which the meta data is programmed in the storage system 100. For example, the status data may indicate the order in which the meta data is programmed the host memory 120, firmware storage unit 213, buffer memory 214, and memory device 23. Specifically, first meta data, second meta data, and third meta data may be sequentially programmed into the storage system 100. Then, status data of the first meta data may be a first value, status data of the second meta data may be a second value, and status data of the third meta data may be a third value. According to an example embodiment, the third value>the second value>the first value. In this case, the memory controller 21 may determine final meta data corresponding to the memory device 23 by comparing the first value of the status data of the first meta data stored in the storage system 100 and the second value of the status data of the second meta data. Since the second value is greater than the first value, the memory controller 21 may determine the second meta data as the final meta data. As another example, the status data may be a date on which the meta data is written to the storage device 20. Then, the memory controller 21 may determine meta data having the latest date as status data as the final meta data. However, the disclosure is not limited thereto, and the status data may be data in an appropriate form for indicating a correspondence between parameters and the memory device 23.

Furthermore, the meta data may include production data representing production information related to the memory device 23. In an example embodiment, the production data may be data indicating a manufacturing line on which the memory device 23 is manufactured.

In parallel with the development of memory devices, the development of firmware is carried out. However, when the characteristics of the memory device change due to process improvement or manufacturing line change, it may be necessary to change the firmware. This is called the dependency between hardware and firmware. However, since the memory controller 21 according to an example embodiment can determine final meta data corresponding to the memory device 23 among the plurality of pieces of meta data using the status data, dependency between hardware elements and firmware development can be alleviated.

For example, the firmware for the first memory device manufactured on a first manufacturing line may be driven using the first metadata. The first meta data may include a first parameter, status data of the first value, and production data for the first manufacturing line. In this case, since only one meta data, that is, the first meta data, is programmed in the storage system 100, the memory controller 21 may operate the firmware using the first meta data having the most recent status data for the first memory device.

After the first memory device is manufactured on the first manufacturing line, the process may be improved such that the characteristics of the memory device itself can be changed. For example, the second memory device may be manufactured on the same first manufacturing line as the first memory device. Although manufactured on the same manufacturing line as the first memory device, the firmware for the second memory device may be driven using the second meta data rather than the first meta data. The second meta data may include the second parameter, status data of the second value, and production data for the first manufacturing line. In this case, two meta data, that is, the first meta data and the second meta data, are programmed in the storage system 100. Since production data of first meta data and second meta data are the same, the memory controller 21 may determine second meta data having the latest status data as the final meta data. In this case, the memory controller 21 may determine the most up-to-date status data by comparing the status data values of each of the first meta data and the second meta data. Since the second value is greater than the first value, the status data of the second meta data may be determined to be the most up-to-date. Therefore, the memory controller 21 may drive the firmware using the second meta data having the most up-to-date status data for the second memory device.

Next, a third memory device may be manufactured in a newly opened second manufacturing line as the manufacturing line is diversified. Firmware for the third memory device may be driven using the third meta data. The third meta data may include a third parameter, status data of a third value, and production data for a second manufacturing line. Since the production data of the first meta data and the second meta data indicate the first manufacturing line, and the production data of the third meta data indicates the second manufacturing line, the memory controller 21 may determine meta data having production data for the second manufacturing line in which the third memory device is manufactured as final meta data. That is, the memory controller 21 may determine third meta data having production data for the second manufacturing line as final meta data. Therefore, the memory controller 21 may drive the firmware using the third meta data for the second memory device.

Meanwhile, a fourth memory device may be manufactured in the first manufacturing line again later. The firmware for the fourth memory device may be driven using the second meta data. Since the production data of first meta data and second meta data represent the first manufacturing line and the production data of the third meta data represents the second manufacturing line, the memory controller 21 may select at least one meta data (i.e., of first meta data and second meta data) having production data for the first manufacturing line on which the fourth memory device is manufactured, and determine second meta data having status data of the most recent meta data of first meta data and second meta data as final meta data.

In an example embodiment, the firmware storage unit 213 may include address information for each of a plurality of locations in which the plurality of pieces of meta data may be stored. For example, the meta data may be stored in at least one of the buffer memory 214, the host memory 120, and the memory device 23 in the memory controller 21. The processor 212 may read the meta data stored in the plurality of locations based on address information in the firmware storage unit 213 to drive firmware.

In an example embodiment, at least one of the memory controller 21, the memory device 23, and the host device 10 may store the meta data. The memory controller 21 may determine one of the at least one meta data as the final meta data by using the status data of the at least one meta data.

The buffer memory 214 may temporarily store data to be programmed into the memory device 23 or data to be read from the memory device 23. The buffer memory 214 may be a component included in the memory controller 21, but may be disposed outside the memory controller 21 according to embodiments. For example, the buffer memory 214 may include a volatile random access memory such as DRAM, SDRAM, DDR SDRAM, DDR2 SDRAM, DDR3 SDRAM, LPDDR SDARM, LPDDR3, SDRAM, LPDDR3 SDRAM, and the like.

In an example embodiment, the buffer memory 214 may store parameters. The buffer memory 214 may store firmware read from the memory device 23 and parameters required to drive firmware. The memory controller 21 may read parameters for driving the firmware and parameters stored in the memory device 23 through the bootloader stored in the firmware storage unit 213 during booting, and store them in the buffer memory 214.

The ECC engine 215 may perform error detection and correction functions for read data read from the memory device 23. The ECC engine 215 may be implemented as dedicated hardware, or as firmware using the processor 212.

For example, the ECC engine 215 may generate parity bits for program data to be programmed in the memory device 23. The parity bits generated by the ECC engine 215 may be stored in the memory device 23 together with program data. When reading data from the memory device 23, the ECC engine 215 corrects an error in the read data using the parity bits read from the memory device 23 together with the read data, and may output the read data with the error corrected.

Meanwhile, a method used by the ECC engine 215 in the memory controller 21 to correct an error may be different depending on the storage device 20. Since the parity bit value varies depending on the operating method of the ECC engine 215, the value of meta data may change when reading the meta data programmed in the buffer memory 214, the firmware storage unit 213, and the memory device 23 in the memory controller 21 through the ECC engine 215. Accordingly, when the memory controller 21 programs and reads meta data into the buffer memory 214, the firmware storage unit 213, and the memory device 23, it may be programed and read through a separate encryption method instead of through the ECC engine 215. In addition, even when programming the meta data in the host device 10, it may be programmed and read through separate encryption.

Meanwhile, when the memory controller 21 determines final meta data from the plurality of pieces of meta data and programs the determined final meta data into one memory block among a plurality of memory blocks, the ECC engine 215 may program and read the final meta data.

The memory device 23 may include a flash-based memory, for example, a NAND flash memory. The flash memory may include a two-dimensional (2D) NAND memory array or a three-dimensional (3D) (or vertical) NAND (VNAND) memory array. In an example embodiment, the memory device 23 may include, for example, a phase-change memory, a resistive memory, a magnetoresistive memory, a ferroelectric memory, or a polymer memory.

Referring to FIG. 2, the memory device 23 may include a control circuit 231, a memory cell array 232, a voltage generator 233, a row decoder 234, a page buffer circuit 235, and a data input and output (I/O) circuit 236. In addition, according to another example embodiment, the memory device 23 may further include a turbo write buffer.

The control circuit 231 controls the voltage generator 233, the row decoder 234, and the page buffer circuit 235 in response to a command word (CMD) and an address (ADDR) transmitted from the memory interface 211. For example, the address ADDR may include an X address signal (X_ADDR) and a Y address signal (Y_ADDR).

The control circuit 231 may generate control signals for controlling the memory cell array 232, the voltage generator 233, the row decoder 234, and the page buffer circuit 235. For example, the control signal may include various signals for programming data into the memory cell array 232 or reading data from the memory cell array 232. In an example embodiment, the control signal may include an initialization signal INIT, an X address signal X_ADDR, a Y address signal Y_ADDR, and a voltage control signal CTRL_vol. The control circuit 231 may control the page buffer circuit 235 to perform a read operation and a program operation on the memory cell selected by the row decoder 234 using a control signal.

The memory cell array 232 may store data transmitted from the memory interface 211 under the control of the control circuit 231. The memory cell array 232 may output stored data to the memory interface 211 under the control of the control circuit 231.

The memory cell array 232 may include a plurality of memory blocks BLK1 to BLKz (z is a positive integer). The plurality of memory blocks BLK1 to BLKz each may include a plurality of memory cells connected to a single word line WL. The memory cell array 232 may be connected to the page buffer circuit 235 through bit lines BLs. The memory cell array 232 may be connected to the row decoder 234 through word lines WLs, string selection lines SSLs, and ground selection lines GLSs. The plurality of memory cells may be read or programmed by a voltage provided by at least one of bit lines BLs and word lines WLs.

At least one of the plurality of memory blocks BLK1 to BLKz may be a meta block MBLK 2310. In an example embodiment, the meta block 2310 may contain meta data.

The meta block 2320 may be a region in the memory cell array 230 that is not disclosed to users. Since predetermined information related to the memory device 20 is stored in the meta block 2320, the data programmed in the meta block 2320 must be safely protected against external manipulation and must not be easily changed. The meta block 2320 may be in one of an update state, an empty state, and a decision state.

The update state indicates a state in which meta data is stored in the meta block 2320, but the stored meta data can be changed. The empty state indicates a state in which no data is stored in the meta block 2320. The decision state indicates a state in which meta data is stored in the meta block 2320.

In an example embodiment, the memory controller 21 may store data stored in the meta block 2320 by a bootloader in the buffer memory 214.

In an example embodiment, the memory controller 21 may change the state of the meta block 2320 in response to the update command. For example, the update command may be a command input to the memory controller 21 when new meta data is programmed at an arbitrary position or when firmware is updated and new parameters are required to operate the firmware. The update command may be received by the memory controller 21 from the host device 10 or may be a command generated by the memory controller 21 itself. For example, the memory controller 21 may change the meta block to an update state in response to an update command. Meanwhile, the memory controller 21 may determine one meta data among meta data stored in a plurality of locations as final meta data in response to the update command.

In an example embodiment, the memory controller 21 may determine one meta data among meta data stored in a plurality of locations as final meta data in response to a parameter check command. For example, the plurality of locations may include at least one of the memory controller 21, the memory device 23, and the host device 10. In an example embodiment, the memory controller 21 may store final meta data in the meta block 2320. However, in this case, the meta block 2320 may be in an updated state or an empty state.

In embodiment, the memory controller 21 may determine one meta data among meta data stored in the plurality of locations as final meta data whenever a specific host command is input. The memory controller 21 may determine one meta data of a plurality of pieces of meta data stored in the plurality of locations as final meta data whenever a firmware download command is input from the host device 10. Alternatively, the memory controller 21 may determine one meta data among the plurality of pieces of meta data stored in the plurality of locations as the final meta data at predetermined intervals in advance. In this case, the meta block 2320 may be in an updated state or an empty state. When the meta block is in a decision state, the memory controller 21 does not perform an operation of determining one meta data among the plurality of pieces of meta data stored in the plurality of locations as the final meta data, but the firmware may be driven based on the meta data in the meta block.

The storage device 20 may drive firmware based on meta data stored in the meta block 2320.

In an example embodiment, the memory cell array 232 may include a three-dimensional memory cell array. For example, the memory cell array 232 may include a plurality of NAND cell strings. Each channel of the cell string may be formed in a vertical or horizontal direction. Each NAND string may include memory cells respectively connected to word lines WLs vertically stacked on a substrate.

However, the disclosure is not limited thereto, and in some embodiments, the memory cell array 232 may include a two-dimensional memory cell array.

The voltage generator 233 may generate various types of voltages for performing read, program, and erase operations according to a voltage control signal CTRL_vol of the control circuit 231. For example, the voltage generator 233 may generate a program voltage, a read voltage, a program verification voltage, an erase voltage, and the like as a work line voltage VWL.

The row decoder 234 may be connected to the memory cell array 232 through the word lines WLs, the string selection lines SSLs, and the ground selection lines GLSs. The row decoder 234 may select one memory block of the memory cell array 232 in response to an X address signal X_ADDR received from the control circuit 231. In other words, the row decoder 234 may select one word line WL from among the plurality of word lines WL in response to the X address signal X_ADDR. The row decoder 234 may transmit a voltage corresponding to the operation of the memory block to the word line WL of the selected memory block.

The page buffer circuit 235 may be connected to the memory cell array 232 through the bit lines BLs. The page buffer circuit 235 may select at least one bit line among the bit lines BL in response to a column address Y_ADDR. The page buffer circuit 235 may operate as a program driver or sense amplifier according to an operation mode. For example, during a program operation, the page buffer circuit 235 may apply a bit line voltage corresponding to data to be programmed to a selected bit line BL. During a read operation, the page buffer circuit 235 may sense the data stored in the memory cell by sensing a current or voltage of the selected bit line BL.

The data input and output circuit 236 may be connected to the page buffer circuit 235 through data signal lines DLs. The data input and output circuit 236 may provide externally provided data DATA to the page buffer circuit 235. In addition, the data input and output circuit 236 may externally output data latched by the page buffer circuit 235.

Figure 3:
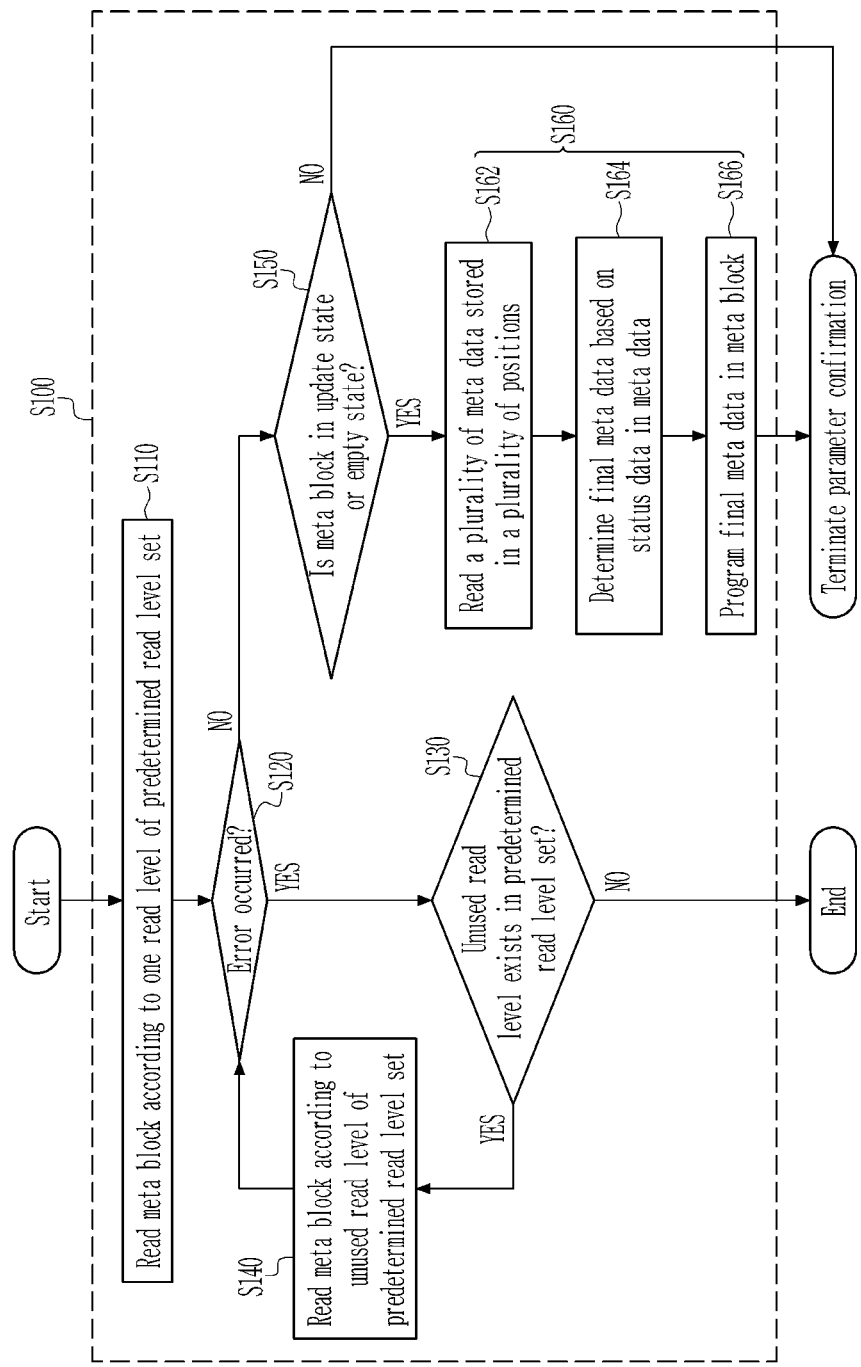
FIG. 3 is a flowchart that shows a parameter confirmation method according to an example embodiment.

FIG. 3 is a flowchart that shows a parameter confirmation method according to an example embodiment.

According to an example embodiment, when power is applied to the storage system 100, a parameter confirmation command may be input to the memory controller 21 by the bootloader. In response to the parameter confirmation command, the memory controller 21 performs parameter confirmation (S100). According to an example embodiment, based on the parameter confirmation command, the memory controller 21 performs parameter confirmation (S100).

According to an example embodiment, in operation S110, the memory controller 21 reads the meta block 2320 according to one of the read level sets. For example, the read level sets may be predetermined.

The memory controller 21 may determine a read level for reading data stored in the memory device 23 in response to a read command. A read level set including a plurality of read levels may be stored in the firmware storage unit 213. For example, the memory controller 21 may select one read level from among the read level sets stored in the firmware storage unit 213 and read the meta block 2320 in the memory cell array 232 according to the selected read level. The read level set may include a plurality of read levels determined in consideration of characteristics, such as a width of the threshold voltage distribution, a threshold voltage level, and the like of the memory cells in the memory cell array 232.

According to an example embodiment, in operation S120, when the memory controller 21 reads the meta block, it is determined whether an error occurs.

Here, when data in the meta block 2320 is read, if the number of fail bits among the read data is greater than or equal to a predetermined number, the memory controller 21 may determine that an error has occurred. For example, the number of fail bits predetermined in advance may be the number of fail bits that can be corrected through the ECC engine 215 for data of an arbitrary memory cell. When the number of fail bits of data read from a certain memory cell is more than the number that can be corrected through the ECC engine 215, it can be understood that an uncorrectable ECC (UECC) has occurred.

According to an example embodiment, in operation S130, when an error occurs while the memory controller 21 reads the meta block 2320, the memory controller 21 determines whether an unused read level among a set of predetermined read levels exists.

According to an example embodiment, in operation S140, when there is an unused read level among the predetermined lead level set, the memory controller 21 reads the meta block 2320 according to the unused lead level among the predetermined read level set.

The memory controller 21 may read the meta block 2320 according to a new and unused read level among the set of predetermined read levels.

When there is no unused lead level among the predetermined lead level set, the parameter confirmation (S100) is terminated.

When the parameter confirmation in S100 ends because there is no unused read level among the predetermined read level set, the memory controller 21 may determine that it is not possible to read the meta block 2320. Accordingly, the memory controller 21 may determine that the memory device 23 is defective.

According to an example embodiment, in operation S150, if no error occurs when the memory controller 21 reads the meta block 2320, it is determined whether the meta block 2320 is in an updated state or an empty state.

According to an example embodiment, in operation S160, when the meta block 2320 is in the updated state or empty state, the memory controller 21 performs meta data searching. The metal data searching (S160) may include reading a plurality of pieces of meta data (S162), determining final meta data (S164), and programming the final meta data (S166).

According to an example embodiment, in operation S162, the memory controller 21 reads the plurality of pieces of meta data stored in the plurality of locations.

For example, meta data may be stored in the firmware storage unit 213 in the memory controller 21, the buffer memory 214, the host memory 120, and the memory device 23. The meta data may include parameters and status data corresponding to each parameter.

Specifically, the memory controller 21 may read the meta data from at least one of the firmware storage unit 213, the buffer memory 214, the host memory 120, and the memory device 23 in the memory controller 21 based on address information for each of the plurality of locations stored in the firmware storage unit 213.

According to an example embodiment, in operation S164, the memory controller 21 determines the final meta data based on the status data in the meta data.

In an example embodiment, the memory controller 21 may determine meta data having the latest status data as final meta data. For example, the memory controller 21 may determine meta data programmed last as the final meta data. When the status data is in the form of an order programmed in the storage system 100, the memory controller 21 may determine meta data having the largest status data as the final meta data. In addition, the memory controller 21 may determine the final meta data further based on production data. For example, the memory controller 21 determines, as final meta data, meta data having the largest status data among meta data having the same production data as the production data corresponding to the manufacturing line in which the memory device 23 is manufactured among the plurality of pieces of meta data.

According to an example embodiment, in operation S166, the memory controller 21 programs the final meta data to the meta block 2320. At the same time, the memory controller 21 may change the meta block 2320 to a decision state.

According to an example embodiment, when power is applied to the storage device 20 again, the memory controller 21 may execute firmware using the final meta data programmed in the meta block 2320.

Meanwhile, when the meta block 2320 is in the decision state, the memory controller 21 ends the parameter confirmation S100. The memory controller 21 may execute the firmware using the meta data programmed in the meta block 2320, which is in the decision state.

Figure 4:
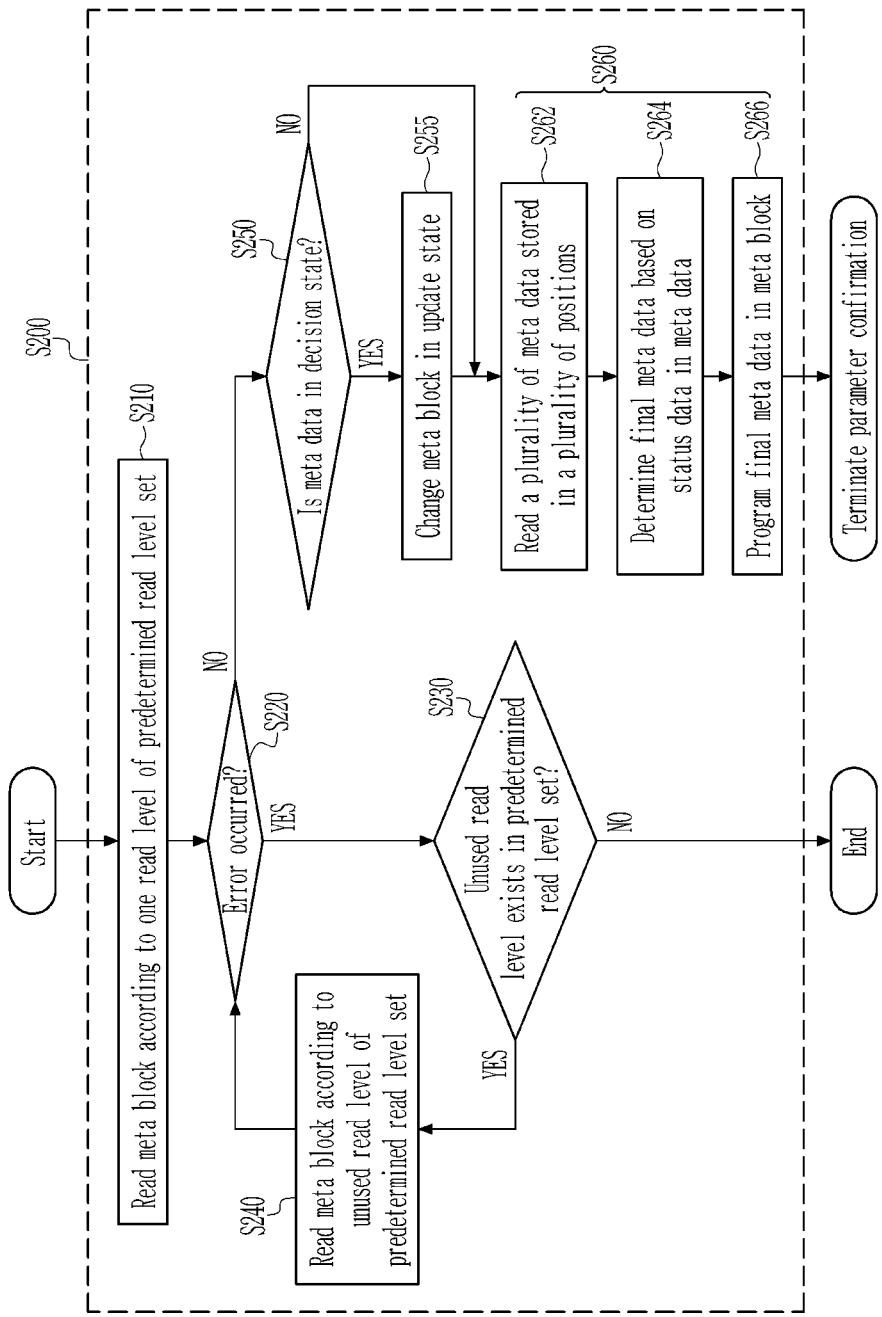
FIG. 4 is a flowchart that shows a parameter update method according to an example embodiment.

FIG. 4 is a flowchart that shows a parameter update method according to an example embodiment.

According to an example embodiment, in response to the update command, the memory controller 21 performs updating (S200).

According to an example embodiment, in operation S210, the memory controller 21 reads the meta block 2320 according to one of the read level sets. For example, the read level sets may be predetermined.

According to an example embodiment, in operation S220, when the memory controller 21 reads the meta block, it is determined whether an error occurs.

According to an example embodiment, in operation S230, if an error occurs when the memory controller 21 reads the meta block 2320, the memory controller 21 determines whether an unused read level exists among a set of predetermined read levels.

According to an example embodiment, in operation S240, when there is an unused read level among the predetermined lead level set, the memory controller 21 reads the meta block 2320 according to the unused read level among the predetermined read level set.

According to an example embodiment, when there is no unused read level among the predetermined read level set, the updating S200 ends.

According to an example embodiment, when the update step S200 ends because there is no unused read level among the predetermined lead level set, the memory controller 21 may determine that it is impossible to read the meta block 2320. Accordingly, the memory controller 21 may determine that the memory device 23 is defective.

According to an example embodiment, in operation S250, if no error occurs when the memory controller 21 reads the meta block 2320, it is determined whether the meta block 2320 is in the decision state.

According to an example embodiment, in operation S255, when the meta block 2320 is in the decision state, the memory controller 21 changes the meta block 2320 to an update state.

According to an example embodiment, in operation S260, when the meta block 2320 is in the updated state or empty state, the memory controller 21 performs meta data search. The meta data search operation (S260) may include the reading the plurality of pieces of meta data (S262), the determining the final meta data (S264), and the programming the final meta data (S266).

First, the memory controller 21 reads a plurality of pieces of meta data stored in the plurality of locations (S262).

According to an example embodiment, in operation S264, the memory controller 21 determines the final meta data based on the status data in the meta data.

According to an example embodiment, in operation S266, the memory controller 21 programs the final meta data in the meta block 2320. At the same time, the memory controller 21 may change the meta block 2320 to a decision state.

According to an example embodiment, in operation S260, when the meta block 2320 is in the updated state or empty state, the memory controller 21 performs the meta data search without performing the operation to change to the updated state (255).

According to an example embodiment, when power is applied to the storage device 20 again, the memory controller 21 may execute firmware using the final meta data programmed in the meta block 2320. In this case, the meta block 2320 may be in the decision state.

FIG. 5 to FIG. 8 are block diagrams that show locations where the meta data is stored.

Figure 5:
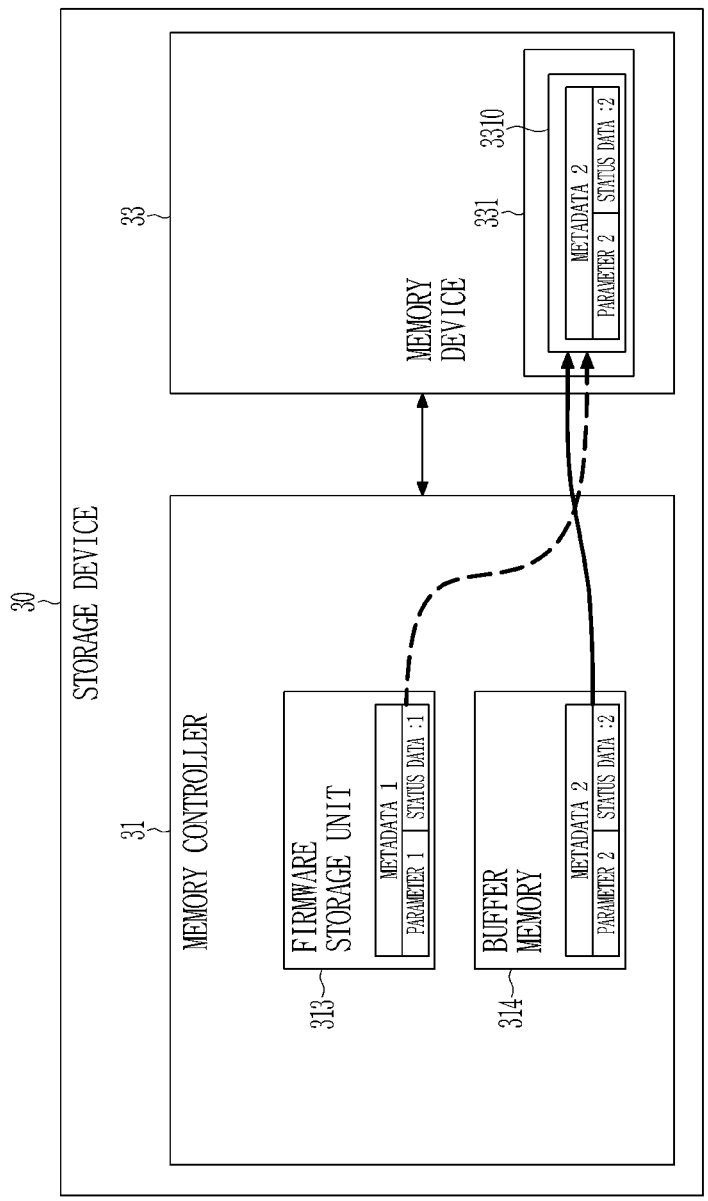
FIGS. 5, 6, 7 and 8 are block diagrams illustrating locations meta data storage locations according to various example embodiments.

According to an example embodiment, FIG. 5 shows that, after power is applied to a storage device 30, the firmware stored in a memory device 33 and parameters for driving the firmware are read through a bootloader stored in a firmware storage unit 313 during booting and stored in a buffer memory 314. For example, the memory controller 31 may read firmware and parameters stored in the meta block 3310 and store them in the buffer memory 314.

Referring to FIG. 5, a storage device 30 according to an example embodiment of the disclosure may include a memory controller 31 and a memory device 33. Here, it is assumed that memory device 33 is not defective.

The memory controller 31 may include a firmware storage unit 313 and a buffer memory 314.

First meta data is stored in the firmware storage unit 313. The first meta data has a first parameter and status data of a first value.

Second meta data is stored in the buffer memory 314. The second meta data has a second parameter and status data of a second value.

The memory device 33 may include a memory cell array 331. The memory cell array 331 may include a meta block 3310.

The second meta data stored in the buffer memory 314 may be read by the memory controller 31 from the meta block 3310 in the memory device 33 and stored in the buffer memory 314. In this case, since the second meta data is stored in the meta block 3310, the meta block 3310 may be in a decision state. The memory controller 31 may drive the firmware using the second meta data stored in the meta block 3310 when a parameter confirmation command is input.

Meanwhile, when an update command is input, the memory controller 31 may change the meta block 3310 in the decision state to an update state. After that, the memory controller 31 may perform meta data search.

The memory controller 31 may read the first meta data in the firmware storage unit 313 and the second meta data in the buffer memory 314. Specifically, the memory controller 31 may read the first meta data and the second meta data based on address information of meta data stored in the firmware storage unit 313.

Since the second value of the second meta data is a larger value than the first value of the first meta data, the memory controller 31 may determine the second meta data as final meta data. The memory controller 31 may program the second meta data into the meta block 3310. At the same time, the memory controller 31 may change the meta block 3310 back to the decision state.

Then, when power is applied to the storage device 30, since the meta block 3310 is in the decision state, the memory controller 31 may drive the firmware using the second meta data programmed in the meta block 3310 without performing meta data search.

There may be a case where new meta data is programmed at an arbitrary position and an update command is input to the memory controller 31. In response to the update command, the memory controller 31 may change the meta block 3310 in the decision state to an update state. After that, the memory controller 31 may perform the meta data search to retrieve the final meta data, and then program the final meta data into the meta block 3310.

Figure 6:
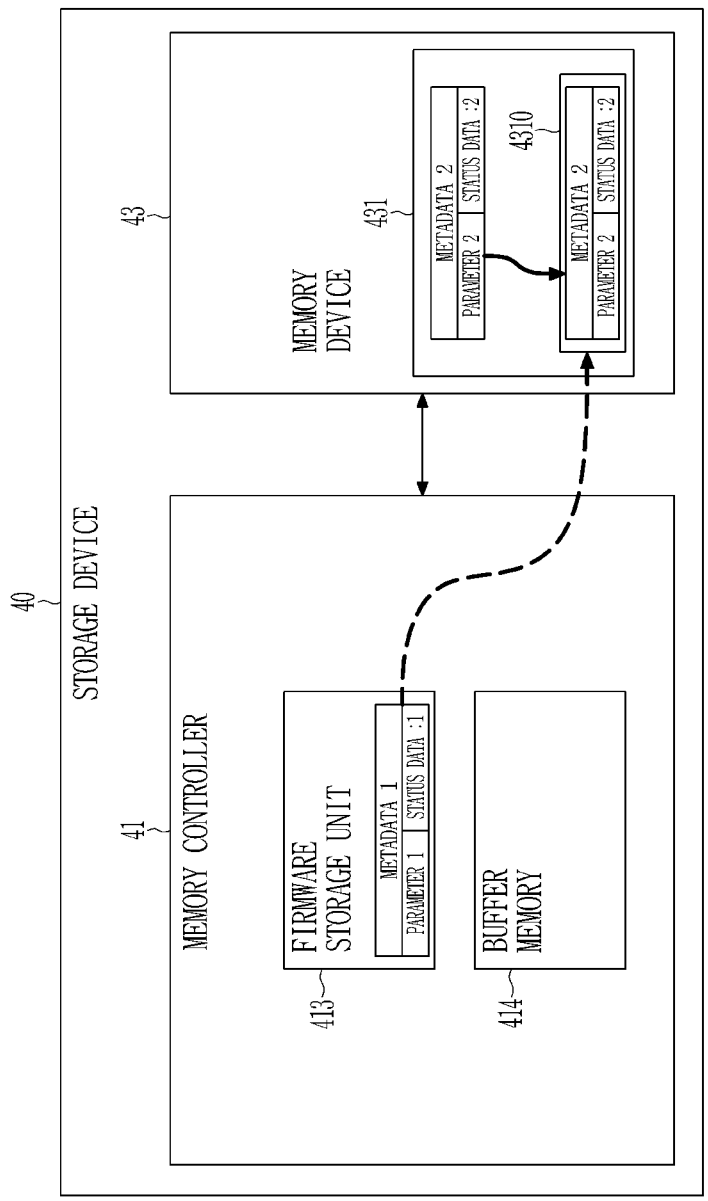

According to an example embodiment, FIG. 6 shows that after power is applied to a storage device 40, the parameters stored in a memory device 43 are read through a bootloader stored in a firmware storage unit 413 during booting, and stored in a buffer memory 414. However, in the case of FIG. 6, the buffer memory 414 does not contain meta data.

Referring to FIG. 6, a storage device 40 according to an example embodiment of the disclosure may include a memory controller 41 and a memory device 43. Here, it is assumed that the memory device 43 is not defective.

The memory controller 41 may include a firmware storage unit 413 and a buffer memory 414.

First meta data is stored in the firmware storage unit 413. The first meta data has a first parameter and status data of a first value.

The memory device 43 may include a memory cell array 431. The memory cell array 431 may include a meta block 4310.

Second meta data is stored in the memory cell array 431. The second meta data has a second parameter and status data of a second value.

When a parameter confirmation command is input, the memory controller 41 may read the first meta data in the firmware storage unit 413 and the second meta data in the memory cell array 431. Specifically, the memory controller 41 may read the first meta data and the second meta data based on address information of meta data stored in the firmware storage unit 413.

Since the second value of the second meta data is a greater value than the first value of the first meta data, the memory controller 41 may determine the second meta data as final meta data. The memory controller 41 may program the second meta data into the meta block 4310. At the same time, the memory controller 41 may change the meta block 4310 to a decision state.

Then, when power is applied to the storage device 40, since the meta block 4310 is in the decision state, the memory controller 41 may drive the firmware using the second meta data programmed in the meta block 4310 without performing meta data search.

There may be a case where new meta data is programmed at an arbitrary position and an update command is input to the memory controller 41. In response to the update command, the memory controller 41 may change the meta block 4310 in the decision state to an update state. After that, the memory controller 41 may program the final meta data into the meta block 4310 after searching for final meta data by performing the meta data search.

Figure 7:
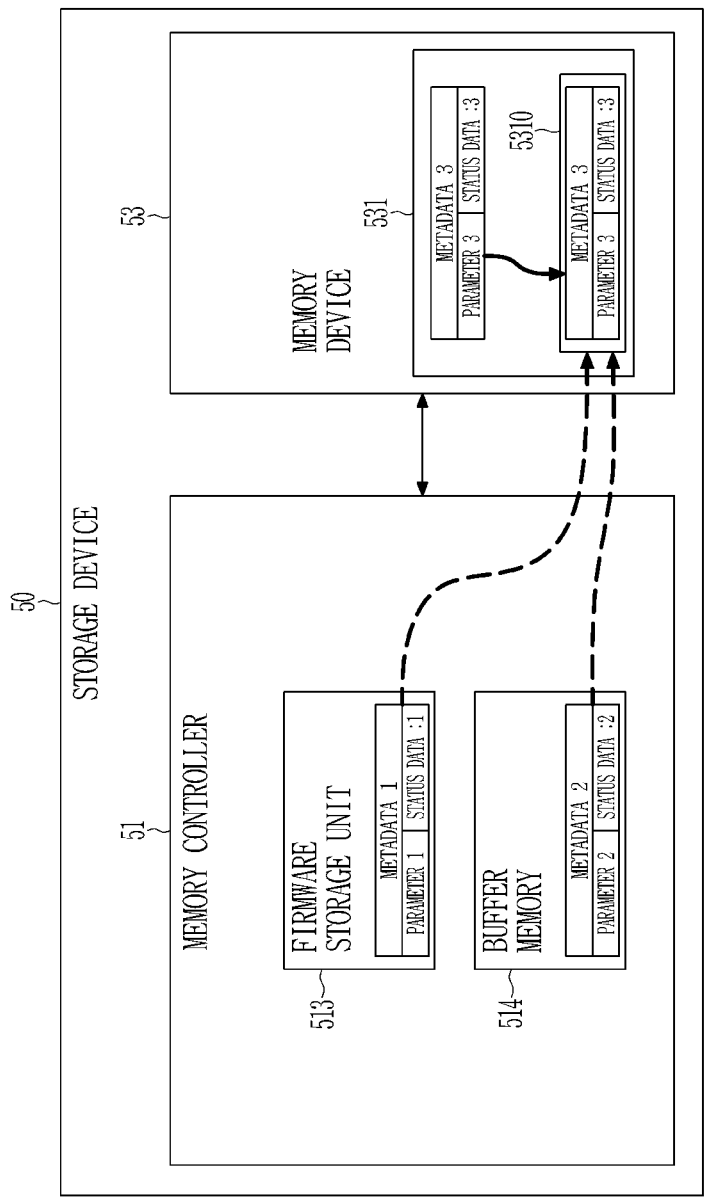

According to an example embodiment, FIG. 7 shows that, after power is applied to a storage device 50, firmware stored in a memory device 53 and parameters for driving the firmware are read through a bootloader stored in a firmware storage unit 513 during booting and stored in a buffer memory 514. For example, a memory controller 51 may read firmware and parameters stored in a meta block 5310 and store them in a buffer memory 514.

Referring to FIG. 7, a storage device 50 according to an example embodiment of the disclosure may include a memory controller 51 and a memory device 53. Here, it is assumed that the memory device 53 is not defective.

The memory controller 51 may include a firmware storage unit 513 and a buffer memory 514.

First meta data is stored in the firmware storage unit 513. The first meta data has a first parameter and status data of a first value.

Second meta data is stored in the buffer memory 514. The second meta data has a second parameter and status data of a second value.

The memory device 53 may include a memory cell array 531. The memory cell array 531 may include a meta block 5310.

Third meta data is stored in the memory cell array 531. The third meta data has a third parameter and status data of a third value.

The second meta data stored in the buffer memory 514 may be read by the memory controller 51 from a meta block in the memory device 53 and stored in the buffer memory 514. In this case, since the second meta data is stored in the meta block 5310, the meta block 5310 may be in a decision state. When a parameter confirmation command is input, the memory controller 51 may drive the firmware using the meta data stored in the meta block 5310.

Meanwhile, when an update command is input, the memory controller 51 may change the meta block 5310 in the decision state to an update state. After that, the memory controller 51 may perform a meta data search.

The memory controller 51 may read the first meta data in the firmware storage unit 513, the second meta data in the buffer memory 514, and the third meta data in the memory cell array 531. Specifically, the memory controller 51 may read the first meta data, the second meta data, and the third meta data based on address information of meta data stored in the firmware storage unit 513.

Since the third value of third meta data has a greater value than the first value of the first meta data and the second value of the second meta data, the memory controller 51 may determine the third meta data as final meta data. The memory controller 51 may program the third meta data into the meta block 5310. At the same time, the memory controller 51 may change the meta block 5310 to the decision state.

Then, when power is applied to the storage device 50, since the meta block 5310 is in the decision state, the memory controller 51 may drive the firmware using the third meta data programmed in the meta block 5310 without performing meta data search.

There may be a case where new meta data is programmed at an arbitrary position and an update command is input to the memory controller 51. In response to the update command, the memory controller 51 may change the meta block 5310 in the decision state to an update state. After that, the memory controller 51 may perform the meta data search to retrieve final meta data, and then program the final meta data into the meta block 5310.

Figure 8:
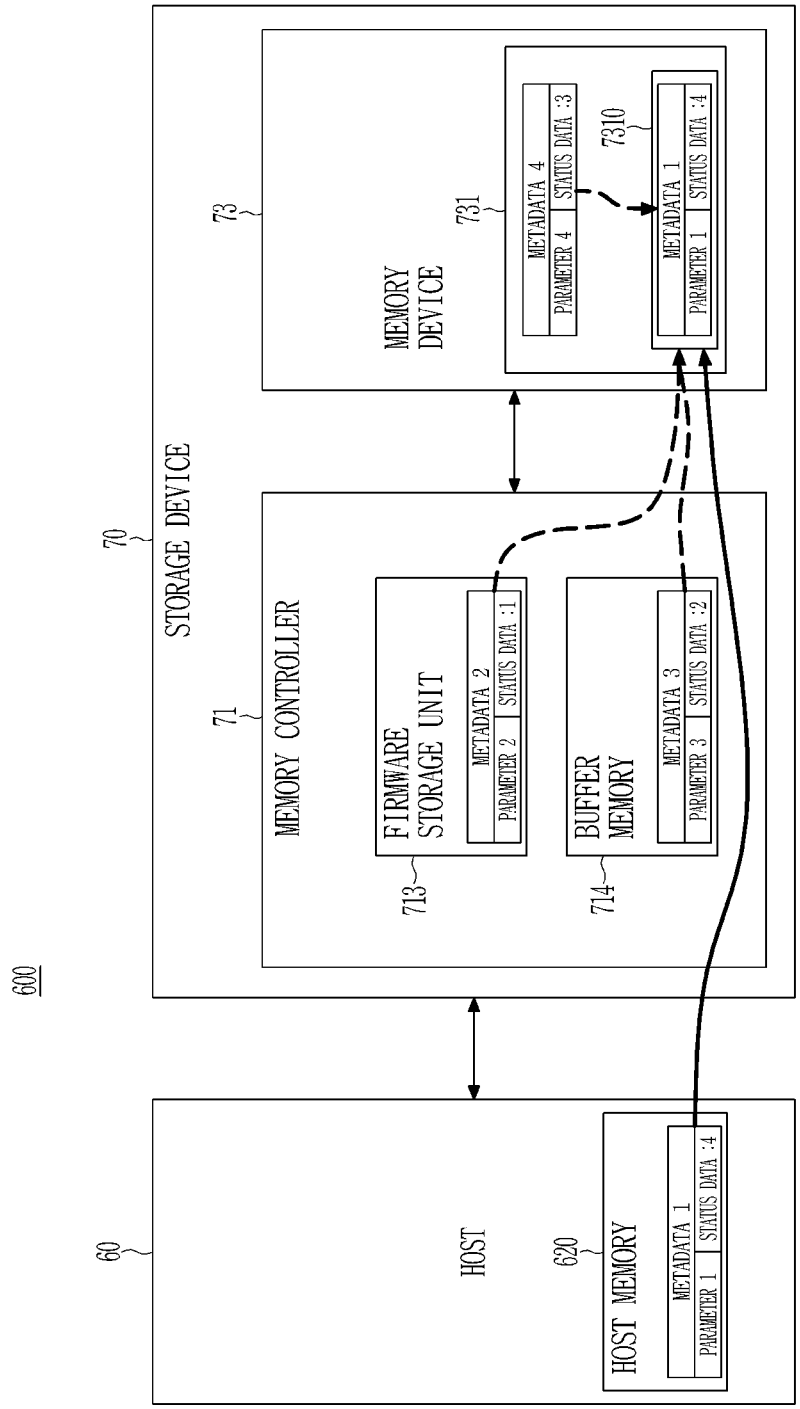

According to an example embodiment, FIG. 8 shows that, after power is applied to a storage device 70, firmware stored in q memory device 73 and parameters for driving the firmware are read through a bootloader stored in a firmware storage unit 713 during booting and stored in a buffer memory 714. For example, a memory controller 71 may read firmware and parameters stored in a meta block 7310 and store them in a buffer memory 714.

Referring to FIG. 8, a storage system 600 according to an example embodiment of the disclosure may include a host device 60 and a storage device 70.

The host device 60 may include a host memory 620.

First meta data is stored in the host memory 620. The first meta data has a first parameter and the status data of a fourth value.

The storage device 70 may include a memory controller 71 and a memory device 73. Here, it is assumed that the memory device 73 is not defective.

The memory controller 71 may include a firmware storage unit 713 and a buffer memory 714.

Second meta data is stored in the firmware storage unit 713. The second meta data has a second parameter and status data of a first value.

Third meta data is stored in the buffer memory 714. The third meta data have a third parameter and status data of a second value.

The memory device 73 may include a memory cell array 731. The memory cell array 731 may include a meta block 7310.

Fourth meta data is stored in the memory cell array 731. The fourth meta data has a fourth parameter and status data of a third value. The third meta data stored in the buffer memory 714 may be read by the memory controller 71 from a meta block in the memory device 73 and stored in the buffer memory 714.

In this case, since the third meta data is stored in the meta block 7310, the meta block 7310 may be in a decision state. When a parameter confirmation command is input, the memory controller 71 may drive the firmware using the third meta data stored in the meta block 7310.

Meanwhile, when an update command is input, the memory controller 31 may change the meta block 7310 in a decision state to an update state. After that, the memory controller 71 may perform meta data search.

The memory controller 31 may read the first meta data in the host memory 620, the second meta data in the firmware storage unit 713, the third meta data in the buffer memory 714, and the fourth meta data in the memory cell array 731. Specifically, the memory controller 71 may read the first meta data, the second meta data, the third meta data, and the fourth meta data based on address information of meta data stored in the firmware storage unit 713.

Since the fourth value of the first meta data is greater than the first value of the second meta data, the second value of the third meta data, and the third value of the fourth meta data, the memory controller 71 may determine the first meta data as final meta data. The memory controller 71 may program the first meta data into the meta block 7310. At the same time, the memory controller 71 may change the meta block 7310 back to the decision state.

Then, when power is applied to the storage device 70, since the meta block 7310 is in the decision state, the memory controller 71 may drive the firmware using the first meta data programmed in the meta block 7310 without performing meta data search.

There may be a case where new meta data is programmed at an arbitrary position and an update command is input to the memory controller 71. The memory controller 71 may change the meta block 7310 in the decision state to the update state. Thereafter, the memory controller 71 may perform meta data search to retrieve final meta data, and then program the final meta data into the meta block 7310.

In FIG. 8, the host memory 620, the firmware storage unit 713, the buffer memory 714, and the memory cell array 731 have been described assuming that they all contain meta data, but the disclosure is not limited thereto, and meta data may be included only in the host memory 620 and the memory controller 71, the host memory 620, and the memory cell array 731.

Figure 9:
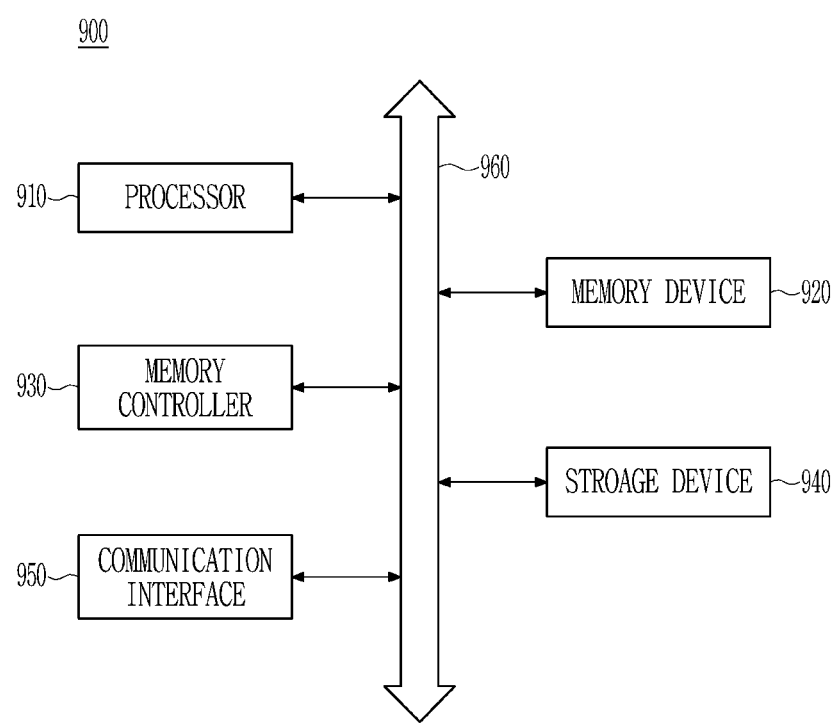
FIG. 9 is a block diagram illustrating a computing system according to an example embodiment.

FIG. 9 is a block diagram illustrating a computing system according to an example embodiment.

Referring to FIG. 9, a computing device 900 includes a processor 910, a memory 920, a memory controller 930, a storage device 940, a communication interface 950, and a bus 960. The computing device 900 may further include other common constituent elements.

The processor 910 controls the overall operation of each component of the computing device 900. The processor 910 may be implemented as at least one of various processing units such as a central processing unit (CPU), an application processor (AP), and a graphics processing unit (GPU).

The memory 920 stores various data and commands. The memory controller 930 controls the transmission of data or commands to and from the memory 920. In an example embodiment, the memory controller 930 may be provided as a separate chip from the processor 910. In an example embodiment, the memory controller 930 may be provided as an internal component of the processor 910.

The storage device 940 stores programs and data. The storage device 940 stores non-temporarily programs and data. In an example embodiment, the storage device 940 may be implemented as a storage device described with reference to FIG. 1 to FIG. 8. The communication interface 950 supports wired and wireless Internet communication of the computing device 900. In addition, the communication interface 950 may support various communication methods other than Internet communication. The bus 960 provides a communication function between constituent elements of the computing device 900. The bus 960 may include at least one type of bus according to a communication protocol between constituent elements.

In an example embodiment, each logic or combination of two or more logics described with reference to FIG. 1 to FIG. 9 may be implemented as a digital circuit, a programmable or non-programmable logic device or array, an application specific integrated circuit (ASIC), and the like.

In related art, parameters necessary for driving firmware have been developed in parallel with the development of a single memory device. However, when the characteristic of the memory device is changed, the parameter change is inevitably accompanied. Therefore, the conventional storage system required a process of deleting the previously programmed firmware and corresponding parameters as the memory device was developed, and programming the firmware and parameters necessary to control the developed memory device. On the other hand, as the performance of the memory device is improved, the size of the parameter to control the memory device also increases, and thus it takes a lot of time to delete and program the firmware and parameters. Therefore, in general, developing firmware and parameters in response to the development of memory devices in the prior art has been a big problem in terms of time and cost.

Meanwhile, the disclosure has the merit of being able to use the latest parameter information required for the firmware of a new memory device without deleting information on parameters required for the firmware controlling the previous memory device. Therefore, there is merit in that the dependency between the development of firmware and the development of memory device, which is hardware, is alleviated. In addition, there is a merit that the time to determine the necessary parameters is relatively increased according to the firmware update.

As above, example embodiments have been disclosed in drawings and specification. Although the embodiments have been described using specific terms in this specification, this is only used for the purpose of explaining the technical idea of the disclosure, and is not used to limit the meaning or scope of the disclosure described in the claims. Therefore, a person of ordinary skill in the art will understand that numerous variations and equally other embodiments are possible from this. Accordingly, the true technical protection range of the disclosure should be determined by the technical spirit of the appended claims range.

What is claimed is:

1. A storage device comprising:
   a memory device comprising a plurality of memory blocks comprising a meta block, the memory device storing first meta data comprising first status data and a first parameter in a first memory block among the plurality of memory blocks; and
   a memory controller configured to:
   store second meta data comprising second status data and second parameter,
   determine final meta data among a plurality of pieces of meta data including the first meta data and the second meta data by comparing a plurality of pieces of status data with the first status data and the second status data based on a status of the meta block,
   perform parameter confirmation for storing the final meta data in the meta block, and
   control the memory device based on a parameter stored in the meta block.

2. The storage device of claim 1, wherein the meta block is the first memory block, and
   wherein the memory controller is further configured to store the first meta data as the final meta data.

3. The storage device of claim 2, wherein the memory controller comprises a buffer memory that stores the first meta data read from the first memory block, and
   wherein the memory controller is further configured to determine the final meta data by comparing the first meta data stored in the buffer memory with the second meta data.

4. The storage device of claim 1, wherein the memory controller comprises a buffer memory that stores third meta data comprising third status data and a third parameter,
   wherein the plurality of pieces of status data further comprise the third status data, and
   wherein the plurality of pieces of meta data further comprise the third meta data.

5. The storage device of claim 4, wherein the first parameter, the second parameter, and the third parameter are data configured to perform a defense code.

6. The storage device of claim 1, wherein the memory controller is further configured to, based on the status of the meta block being an update status in which meta data stored in the meta block is changeable or an empty status in which no meta data is stored in the meta block, perform the parameter confirmation.

7. The storage device of claim 6, wherein the memory controller is further configured to, based on the status of the meta block being a decision status in which meta data is stored in the meta block, control the memory device based on parameters stored in the meta block without the parameter confirmation.

8. The storage device of claim 6, wherein the memory controller is further configured to perform the parameter confirmation based on receiving an update command indicating a status change of the meta block.

9. The storage device of claim 1, wherein the memory controller is further configured to read the meta block based on a read level, among a plurality of read levels in a set.

10. The storage device of claim 1, wherein the memory controller is further configured to program the first meta data to the memory device through an encryption, and program the second meta data to the memory controller through the encryption.

11. A storage system comprising:
    a storage device that stores first meta data comprises first status data and a first parameter in at least one of a memory device comprising a plurality of memory blocks containing a meta block and a memory controller that controls the memory device; and a host device comprising a host memory, which stores second meta data comprising second status data and a second parameter, the host device configured to control the storage device, wherein the storage device is further configured to:

determine final meta data among a plurality of pieces of meta data including the first meta data and the second status data by comparing a plurality of pieces of status data including the first status data and the second status data based on a status of the meta block, and perform parameter confirmation for storing the final meta data in the meta block.

12. The storage system of claim 11, wherein the meta block stores third meta data comprising third status data and a third parameter, wherein the memory controller further comprises a buffer memory storing the third meta data read from the meta block, wherein the plurality of pieces of status data further comprise the third status data, and wherein the plurality of pieces of meta data further comprise the third meta data.

13. The storage system of claim 12, wherein the storage device is configured to, based on the status of the meta block being an update status in which meta data stored in the meta block is changeable or an empty state in which no meta data is stored in the meta block, perform the parameter confirmation.

14. The storage system of claim 13, wherein the memory controller is further configured to, based on the status of the meta block being a decision status in which meta data is stored in the meta block, control the storage device based on parameters stored in the meta block without the parameter confirmation.

15. The storage system of claim 13, wherein the memory controller is further configured to perform the parameter confirmation based on receiving an update command indicating a status change of the meta block.

16. The storage system of claim 13, wherein the memory controller is further configured to read the meta block through a read level among a plurality of read levels in a set.

17. A driving method of a storage system, comprising:

comparing status data of each of a plurality of pieces of meta data stored in at least one of a memory device including a plurality of memory blocks, a memory controller controlling the memory device, and host device interfacing with the memory controller;

determining a final meta data based on a result of the comparing the status data of each of the plurality of pieces of meta data, programming the final meta data in a meta block of the memory device; and controlling the memory device based on the final meta data.

18. The driving method of the storage system of claim 17, further comprising:

before the determining the final meta data:

reading the meta block according to a read level, among a plurality of read levels;

based on the number of fail bits in data for reading the meta block being greater than or equal to a predetermined number, reading the meta block according to an unused read level among the plurality of read levels;

determining a status of the meta block by using data read from the meta block; and based on the meta block is in a decision status in which meta data is stored in the meta block, changing the meta block to an update status before programming the final meta data into the meta block.

19. The driving method of the storage system of claim 17, wherein the determining the final meta data comprises:

reading first meta data from a first memory block among the plurality of memory blocks and storing the read first meta data in a buffer memory in the memory controller; and determining the final meta data by comparing the first meta data stored in the buffer memory with second meta data stored in one of the memory device, the memory controller, and the host device.

20. The driving method of the storage system of claim 17, further comprising, before the determining the final meta data, programming the plurality of pieces of meta data through encryption.

* * * * *